United States Patent [19]

Kosako

[11] Patent Number: 5,233,377
[45] Date of Patent: Aug. 3, 1993

[54] WATERPROOF CAMERA HAVING A REINFORCED COVER

[75] Inventor: Kosei Kosako, Tokyo, Japan

[73] Assignee: Asahi Kogaku Kogyo Kabushiki Kaisha, Tokyo, Japan

[21] Appl. No.: 785,065

[22] Filed: Oct. 30, 1991

[30] Foreign Application Priority Data

Nov. 9, 1990 [JP] Japan ............................ 2-118160[U]

[51] Int. Cl.⁵ .............................................. G03B 17/08
[52] U.S. Cl. .................................................. 354/64
[58] Field of Search ............................ 354/64; 358/99

[56] References Cited

U.S. PATENT DOCUMENTS 4,931,816 6/1990 Kamo et al. ........................ 354/64
5,070,348 12/1991 Hayakawa et al. ................ 354/64

FOREIGN PATENT DOCUMENTS 63-113137 7/1988 Japan .
2236195 3/1991 United Kingdom .
2245375 1/1992 United Kingdom .

Primary Examiner—Michael L. Gellner
Assistant Examiner—J. K. Han
Attorney, Agent, or Firm—Sandler Greenblum & Bernstein

[57] ABSTRACT

A waterproof camera comprising an air bleeding hole connecting the inside and outside of a camera body, an elastic protective cover for covering the air bleeding hole and having an air bleeding groove for connecting the air bleeding hole to the atmosphere. A reinforcing member is further provided in or on the protective cover for reinforcing the air bleeding groove.

27 Claims, 4 Drawing Sheets

1

WATERPROOF CAMERA HAVING A REINFORCED COVER

BACKGROUND OF THE INVENTION

1. Field of the Invention

The present invention relates to a waterproof camera, and more precisely, to a waterproof camera having an air bleeding hole for connecting the inside and outside of the camera body.

2. Description of Related Art

Recently, waterproof cameras which prevent rain, spray from a stream or river, or splashed water from a swimming pool, etc., from permeating the body of a camera have been on the market. To provide a waterproof zoom camera, it is necessary to provide a taking lens barrel which is movable in the optical axis direction with respect to the camera body so as to project from or retract into the camera body through an opening formed in the front wall of the camera body. The lens barrel must be water-sealed with respect to the camera body by an O-ring, for example, which is provided in the gap between the lens barrel and the opening in the camera body.

In practice, a change in internal volume of the camera body, due to the axial movement of the lens barrel' must be taken into consideration. Namely, the operational force to move the lens barrel varies in accordance with the change in the internal volume of the camera body. To solve this problem, the camera body is provided with an air bleeding hole which connects the inside and the outside of the camera body. The air bleeding hole is covered with an air permeable and water impermeable filter to ensure smooth zooming and focusing.

However, if the air permeable and water impermeable filter is provided and exposed on the outer wall of the camera body, while the air resistance of the air bleeding hole may be reduced, the air permeable and water impermeable filter itself can be damaged. Furthermore an exposed filter on the surface of a camera adversely affects the appearance of the camera.

To avoid this, it is possible to provide the air permeable and water impermeable filter on the grip portion of the camera. The air permeable and water impermeable filter can be protected by a protective cover made of an elastic material, such as rubber.

However, since the protective cover must be provided on the inner surface thereof with air bleeding grooves to connect the air permeable and water impermeable filter to the atmosphere, the air bleeding grooves decrease the thickness of the protective cover resulting in a decreased resistance to an external force applied thereto. Consequently, the protective cover can be easily deformed when it is grasped by an operator thereby causing the air permeable and water impermeable filer to be depressed and deformed, this may cause the latter to be damaged or its effectiveness deteriorated.

SUMMARY OF THE INVENTION

The primary object of the present invention is to provide a waterproof camera which is similar in appearance to a conventional camera and in which the air bleeding hole and the surroundings thereof are free from external forces which occur when the camera is grasped by an operator.

To achieve the object mentioned above, according to the present invention, there is provided a waterproof camera having a camera body comprising an air bleeding hole connecting the inside and outside of the camera body, a protective cover made of an elastic member covering the air bleeding hole and having an air bleeding groove for connecting the air bleeding hole to the atmosphere, and a reinforcing member provided in or on the protective cover for reinforcing the air bleeding groove.

With this arrangement, if an external force is applied to the protective cover, the external force is restricted by the reinforcing member in the air bleeding groove so that the protective cover is prevented from being deformed. This prevents a direct force from being exerted on the air bleeding hole and the surroundings thereof.

Preferably, the reinforcing member is made of rigid material, such as metal and has a wide plate portion which is bent at opposite ends, in the same direction, into leg portions.

Preferably, the wide plate portion of the reinforcing member covers the air bleeding hole. The length of the leg portions of the reinforcing member is such that when the wide plate portion is fitted in the air bleeding groove, the leg portions are fully received in the air bleeding groove without projecting therefrom.

In a preferred embodiment, the reinforcing member is fitted in the air bleeding groove with the wide plate portion corresponding to the air bleeding hole.

The reinforcing member can be integrally formed with the protective cover by an insertion molding.

It is possible to make the reinforcing member out of a plate or a plurality of wires.

Preferably, the camera body has a grip portion which is provided with an arched curved wall portion in which the air bleeding hole is formed. An air permeable and water impermeable filter can be attached to the arched curved wall portion to fit flush against the curved surface thereof and cover the air bleeding hole.

BRIEF DESCRIPTION OF THE DRAWINGS

Below, a detailed explanation will be made of the present invention based on embodiments shown in the attached drawings, in which.

DETAILED DESCRIPTION OF THE PREFERRED EMBODIMENTS

Figure 1:
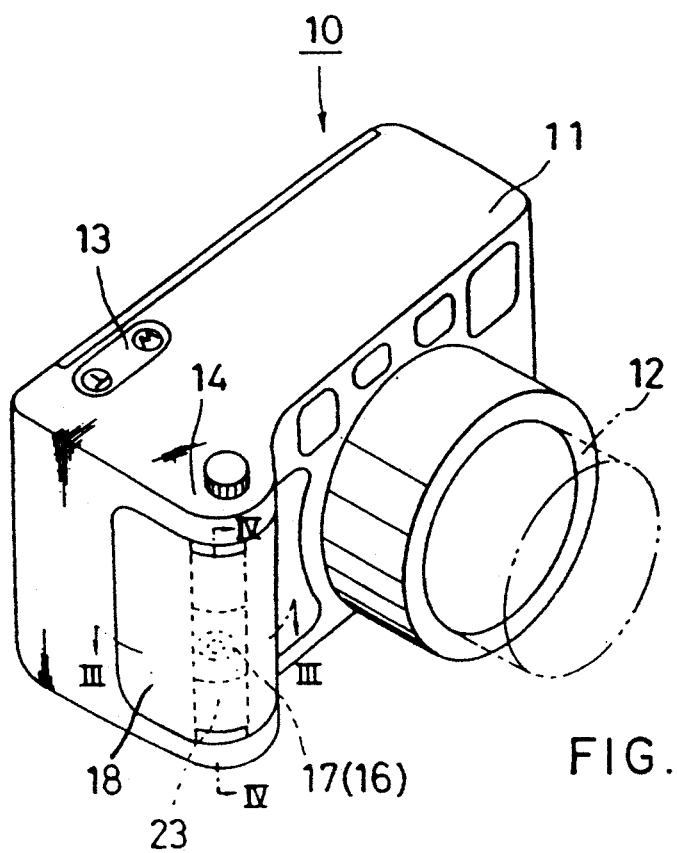
FIG. 1 is a perspective view of a waterproof camera according to a first embodiment of the present invention.

The waterproof camera 10 includes a watertight camera body 11 having a taking lens (photographing lens) barrel 12 provided therein in a watertight fashion. The taking lens 12 can be moved in the optical axis direction by, for example, a zoom switch 13 provided on the upper surface of the camera body 11 provided to effect the zooming function. Zooming, i.e., the axial movement of the taking lens barrel 12' causes the internal volume of the camera body 11, including the taking lens barrel 12, to change.

Figure 3:
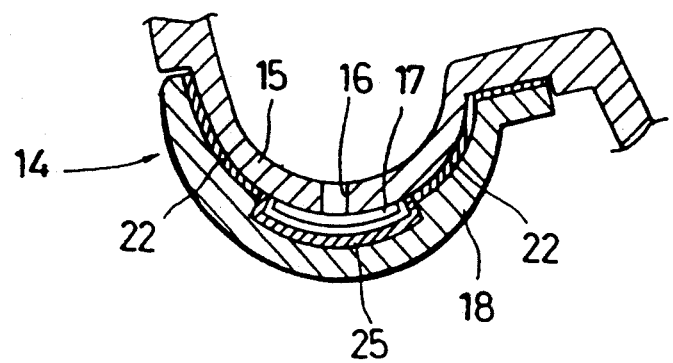
FIG. 3 is a sectional view taken along the line III—III in FIG. 1.
Figure 4:
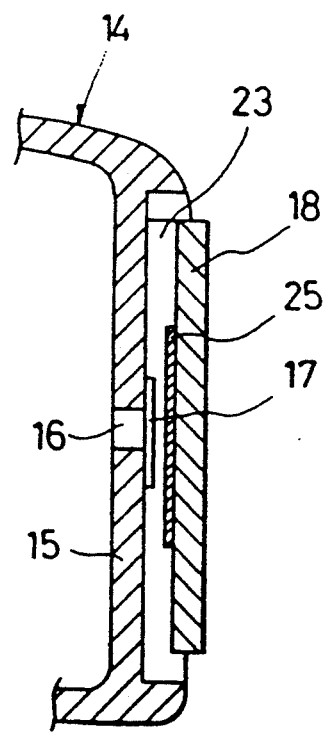
FIG. 4 is a sectional view taken along the line IV—IV in FIG. 1.

The camera body 11 has a grip portion 14 provided on the left portion of the camera body as viewed from the front. The grip portion 14 is provided on an arched curved wall portion 15 (FIG. 3) with an air bleeding hole 16 which connects the inside and the outside of the camera 11. The air bleeding hole 16 is covered by an air permeable and water impermeable filter 17 which is flush with the arched curved surface 15 and is adhered thereto in a watertight fashion. The air permeable and water impermeable filter 17 permits air to permeate therethrough and prevents water from permeating therethrough. The air permeable and water impermeable filter 17 can be made of, for example, porous tetrafluoroethylene which is available on the market.

Figure 2:
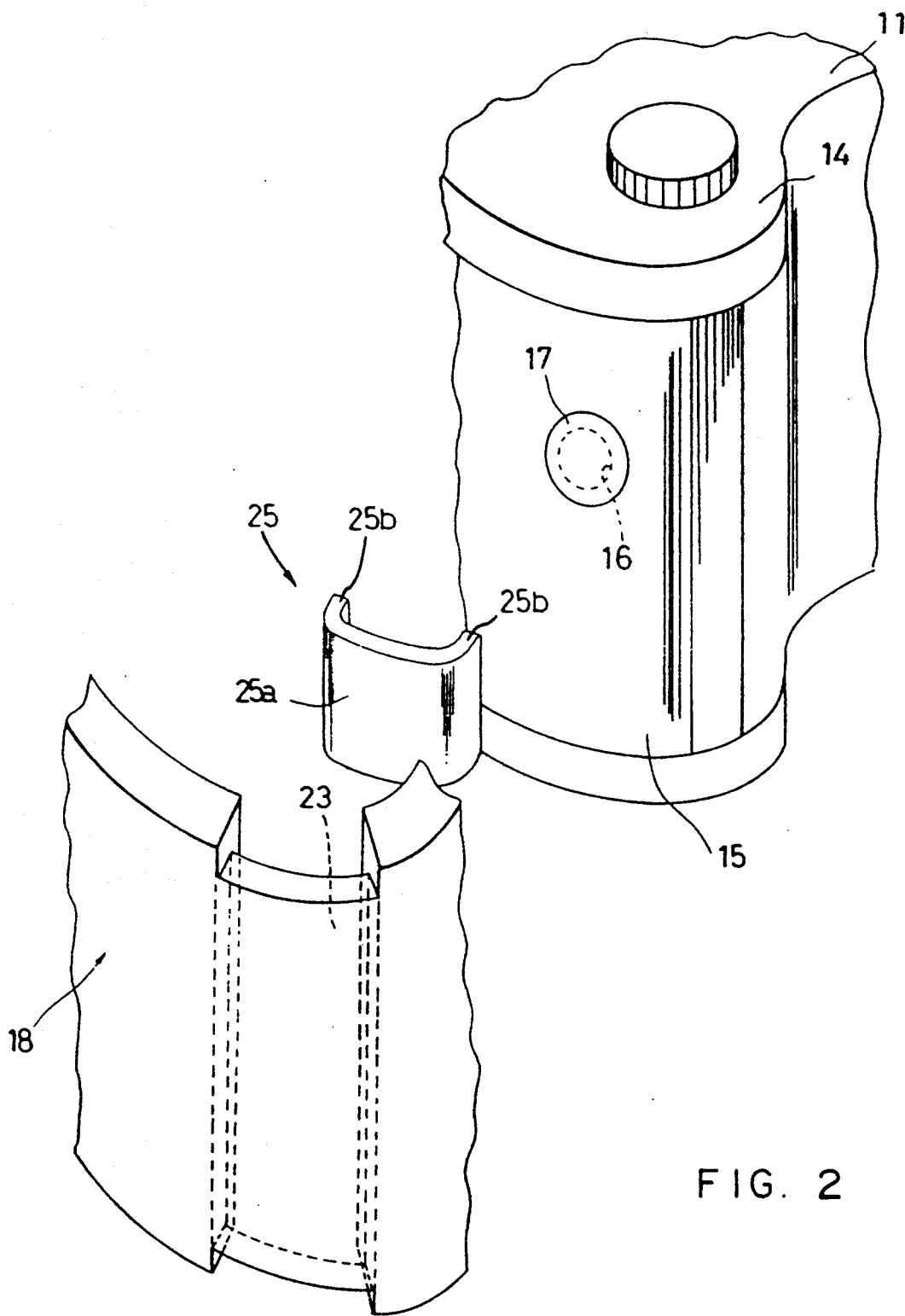
FIG. 2 is an enlarged perspective view of a main part of a waterproof camera, as shown in FIG. 1.

A protective cover 18 is provided on the arched curved surface portion 15 to cover the air permeable and water impermeable filter 17, so as to prevent direct impact of water on the air bleeding hole. The protective cover 18 is made of an elastic material, such as synthetic resin or rubber, and is shaped into a substantially semicircular-shape corresponding to the arched curved surface portion 15. The protective cover 18 is provided on the inner surface thereof with air bleeding groove 23 (FIG. 2) which extends in the vertical direction to connect the air permeable and water impermeable filter 17 to the atmosphere. The protective cover 18 is adhered to the curved surface portion 15 by an adhesive or an adhesive tape 22 (FIG. 3) having adhesives on both sides thereof, applied to the portion of the protective cover other than the air bleeding groove 23.

The portion of the air bleeding groove 23 that corresponds to the air bleeding hole 16 (air permeable and water impermeable filter 17) has a reinforcing member 25 fitted and secured therein. The reinforcing member 25 is made of a rigid plate, such as metal, for example. The reinforcing member 25 has a wide plate portion 25a, the ends of which are bent into leg portions 25b which extend in the same direction. The wide plate portion 25a has a large enough width to cover the cross sectional areas of the air bleeding hole 16 and the air permeable and water impermeable filter 17. The length of the leg portions 25b is such that when the wide plate portion 25a is fitted in the air bleeding groove 23, the leg portions 25b do not inwardly project from the adhesive tape 22 adhered to the inner surface of the protective cover 18, that is, the leg portions 25b are completely received in the air bleeding groove 23, so as not to project therefrom.

In the waterproof camera as constructed above, when the internal volume within the camera body 11 and the taking lens barrel 12 varies in accordance with the axial movement of the taking lens barrel 12 with respect to the camera body 11, the amount of air, corresponding to the change of the internal volume, is introduced into and discharged from the camera body through the air permeable and water impermeable filter 17. Consequently, there is no increase in the operational force required to move the taking lens barrel 12 due to internal pressure of the camera body 11 and the taking lens barrel 12. If a liquid, such as water, is splashed on the protective cover 18, little or no liquid reaches the air permeable and water impermeable filter 17. Even if liquid does reach the air permeable and water impermeable filter 17, the liquid will not permeate the filter, thereby preventing water from entering the camera body.

Since the air permeable and water impermeable filter 17 is covered by the protective cover 18, neither the operator's hand nor ambient foreign matter comes into direct contact with the air permeable and water impermeable filter 17. This prevents the air permeable and water impermeable filter 17 from being damaged, scratched, broken, or clogged. Furthermore, the opposite legs 25b of the reinforcing member 25 project toward the arched curved surface 15, so that the whole wide plate portion 25a protects the air permeable and water impermeable filter 17 in the air bleeding groove 23 of the protective cover 18. This reinforces the air bleeding groove 23. Thus, even if the portion of the protective cover 18, corresponding to the air bleeding groove 23, is strongly depressed, the force is not directly exerted on the air permeable and water impermeable filter 17, thereby protecting the latter.

Although the protective cover 18 is adhered by an adhesive or adhesive tape 22 in the illustrated embodiment, it is possible to use other securing means, such as a hook, a screw, or a combination thereof to detachably connect the protective cover 18. This makes it easy to change the air permeable and water impermeable filter 17 if, for example, it is clogged.

Figure 5:
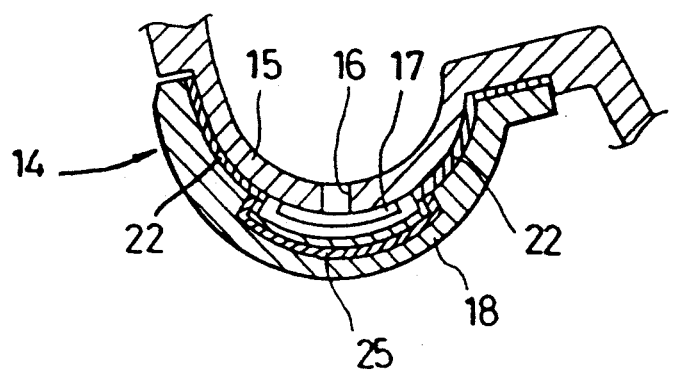
FIGS. 5 and 6 are sectional views of main parts of a waterproof camera according to a second embodiment of the present invention; and, FIG. 7 is a perspective view of a main part of a waterproof camera according to a third embodiment of the present invention.
Figure 6:
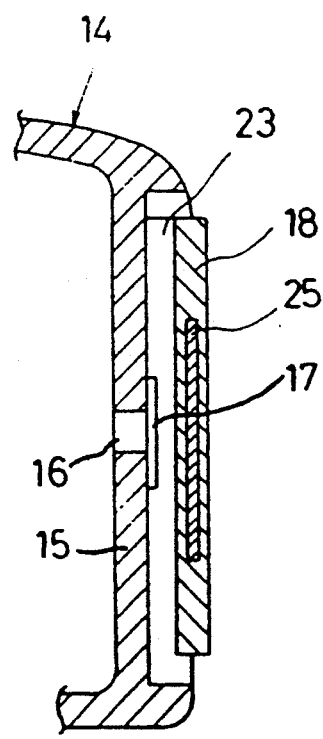

FIGS. 5 and 6 show a second embodiment of the present invention. The only difference between the second embodiment and the first embodiment is how the reinforcing member 25 is mounted to the protective cover 18. Namely, in the second embodiment, illustrated in FIGS. 5 and 6, the reinforcing member 25 is in the form of a plate, similar to the reinforcing member 25 in the first embodiment, and is integrally formed with the protective cover 18 upon insertion molding of the protective cover 18. Consequently, the reinforcing member 25 reinforces the air bleeding groove 23 without directly contacting the water and therefore will not rust. Furthermore, the freedom of selection of the material of which the reinforcing member 25 is made increases. In addition to the foregoing, since the reinforcing member 25 is not exposed to the surface of the protective cover 18, it is impossible for the air permeable and water impermeable filter to be damaged by the reinforcing member 25 upon assembly.

Figure 7:
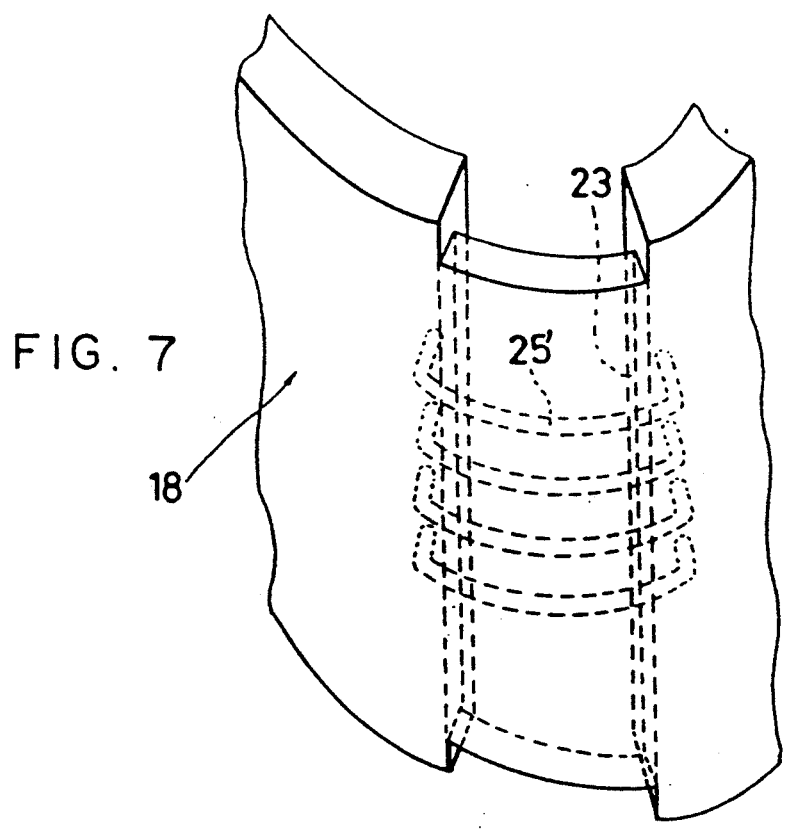

FIG. 7 shows a third embodiment of the present invention in which the reinforcing member 25, in the form of a plate in the second embodiment as shown in FIGS. 5 and 6, is replaced with a reinforcing member 25' which is comprised of a plurality of wires located side by side in the vertical direction. The reinforcing member 25' is integrally formed with the protective cover 18 by an insertion molding, similar to the reinforcing member 25 in the second embodiment. The reinforcing member 25', formed from wires, achieves the same result as that of the reinforcing member 25 in the second embodiment and is lighter than the reinforcing member 25 as a whole.

As can be seen from the above discussion, according to the present invention, since the air bleeding groove is provided to connect the inside of the camera body to the atmosphere and is covered by an elastic protective cover' and since a reinforcing member is provided to reinforce the air bleeding groove, the portion of the protective cover in the immediate neighborhood of the air bleeding hole provides a significant degree of protection. Furthermore, the protective cover adds a unique look and feel to the camera and also allows for a firmer grip of the camera.

Although the invention has been described with reference to particular means, materials and embodiments, it is to be understood that the invention is not limited to the particulars disclosed and extends to all equivalents within the scope of the claims.

We claim:

1. A waterproof camera having a camera body comprising:
   an air bleeding hole connecting the inside and outside of said camera body;
   an elastic protective cover for covering said air bleeding hole and having an air bleeding groove for connecting said air bleeding hole to the outside of said camera body; and
   a reinforcing member for reinforcing said protective cover so that said protective cover will not block said air bleeding groove.

2. A waterproof camera according to claim 1, wherein said reinforcing member is made of rigid material, such as metal.

3. A waterproof camera according to claim 2, wherein said reinforcing member comprises a wide plate portion and leg portions bent at opposite ends of said wide plate portion in a same direction.

4. A waterproof camera according to claim 3, wherein said wide plate portion of said reinforcing member being located over said air bleeding hole to cover a cross sectional area thereof.

5. A waterproof camera according to claim 4, wherein said leg portions of said reinforcing member are fully received in said air bleeding groove without projecting therefrom when said wide plate portion is fitted in said air bleeding groove.

6. A waterproof camera according to claim 5, wherein said reinforcing member is fitted in said air bleeding groove with said wide plate portion corresponding to a position of said air bleeding hole.

7. A waterproof camera according to claim 1, wherein said reinforcing member is integrally formed with said protective cover by an insertion molding.

8. A waterproof camera according to claim 1, wherein said reinforcing member is made of a plate.

9. A waterproof camera according to claim 1, wherein said reinforcing member is made of a plurality of wires.

10. A waterproof camera according to claim 1, wherein said camera body has a grip portion being provided with an arched curved wall portion in which said air bleeding hole is formed.

11. A waterproof camera according to claim 10, further comprising an air permeable and water impermeable filter which is attached to said arched curved wall portion to cover said air bleeding hole 12. A waterproof camera according to claim 11, wherein said reinforcing member comprises a wide plate portion and leg portions bent at opposite ends of the wide plate portion in a same direction, said wide plate portion of said reinforcing member being located over said air bleeding hole to cover a cross sectional area thereof.

13. A waterproof camera according to claim 12, wherein said grip portion of said camera is provided with said arched curved wall portion in which said air bleeding hole is formed.

14. A waterproof camera according to claim 13, wherein said protective cover has a semicylindrical cross section to cover said curved surface of said grip portion.

15. A waterproof camera having a camera body comprising:
    an air bleeding hole connecting the inside and outside of said camera body and being covered by an air permeable and water impermeable filter attached thereto in a watertight fashion;
    an elastaic protective cover for covering said air bleeding hole and having an air bleeding groove for connecting said air bleeding hole to the outside of said camera body; and
    a reinforcing member for reinforcing said protective cover so that said protective cover will not block said air bleeding groove.

16. A waterproof camera according to claim 15, wherein said reinforcing member is made of rigid material, such as metal.

17. A waterproof camera according to claim 16, wherein said reinforcing member comprises a wide plate portion and leg portions bent at opposite ends of said wide plate portion in a same direction.

18. A waterproof camera according to claim 17, wherein said wide plate portion of said reinforcing member being located over said air bleeding hole to cover a cross sectional area thereof.

19. A waterproof camera according to claim 18, wherein said leg portions of said reinforcing member are fully received in said air bleeding groove without projecting therefrom when said wide plate portion is fitted in said air bleeding groove.

20. A waterproof camera according to claim 19, wherein said reinforcing member is fitted in said air bleeding groove with a position of said wide plate portion corresponding to said air bleeding hole.

21. A waterproof camera according to claim 15, wherein said reinforcing member is integrally formed with said protective cover by an insertion molding.

22. A waterproof camera according to claim 15, wherein said reinforcing member is made of a plate.

23. A waterproof camera according to claim 15, wherein said reinforcing member is made of a plurality of wires.

24. A waterproof camera according to claim 15, wherein said camera body has a grip portion which is provided with an arched curved wall portion in which said air bleeding hole is formed.

25. A waterproof camera according to claim 24, wherein said air permeable and water impermeable filter is attached to said arched curved wall portion of said grip portion to cover a curved surface thereof.

26. A waterproof camera according to claim 25, wherein said reinforcing member comprises a wide plate portion and leg portions bent at opposite ends of said wide plate portion in a same direction, said wide plate portion of said reinforcing member being located over said air bleeding hole to cover a cross sectional area thereof.

27. A waterproof camera according to claim 15, wherein said camera body has a grip portion being provided with an arched curved wall portion in which said air bleeding hole is formed and wherein said protective cover has a semicircular cross section to cover a curved surface of said grip portion.

* * * * *